United States Patent [19]

Crandall

[11] 4,258,986
[45] Mar. 31, 1981

[54] ELECTRIC BOOKS AND MICROFILM STRUCTURES AND THE PRODUCTION THEREOF FOR USE IN ELECTRIC BOOKS

[76] Inventor: Richard W. Crandall, 150 W. Huron St., Chicago, Ill. 60610

[21] Appl. No.: 734,100

[22] Filed: Oct. 20, 1976

[51] Int. Cl.³ .................... G03B 23/12; G03B 21/00
[52] U.S. Cl. .................... 353/26 R; 352/78 R; 353/120
[58] Field of Search .................... 353/120, 26 R; 352/78 R, 37; 428/203, 68, 76

[56] References Cited

U.S. PATENT DOCUMENTS

| | | | |
|---|---|---|---|
| 3,262,357 | 7/1966 | Warzynski et al. | 353/26 R |
| 3,319,517 | 5/1967 | Rondas et al. | 353/27 R |
| 3,523,657 | 8/1970 | Hearon et al. | 352/78 R |
| 3,627,619 | 12/1971 | Fromm | 428/203 |
| 3,684,635 | 8/1972 | Staats | 428/76 |
| 3,693,983 | 9/1972 | Lemelson | 242/199 |
| 3,841,745 | 10/1974 | Kaye et al. | 353/26 R |
| 3,862,799 | 1/1975 | Smith et al. | 353/26 A |
| 3,950,652 | 4/1976 | Yamashita | 353/26 A |

Primary Examiner—Steven L. Stephan
Attorney, Agent, or Firm—Hill, Van Santen, Steadman, Chiara & Simpson

[57] ABSTRACT

A cord is wound on and off of a pair of drums in a microfilm reader. The cord comprises a strip of microfilm of approximately 1 mm width, encapsulated in a transparent material to protect the film from scraping, scratching and the like as the same moves through a microfilm reading apparatus. The film may be processed in a variety of techniques to record information thereon, and after the recording process the film is encapsulated between a pair of translucent members into a cord which is then wound upon one of the drums and attached at one end to the other drum. The two drums carrying the cord are mounted in a capsule which is a replaceable component of a microfilm reader. Each of the drums is provided with a driven gear and the reader is provided with a pair of driving gears for engagement with respective ones of the driven gears. Additional pairs of drums may be utilized for larger installations in which the information content of the plurality of cords is classified and divided with respect to any desired criteria, such as a catalog or a metropolitan telephone directory which is divided into residential, buying guide, and commerical/industrial directories.

22 Claims, 25 Drawing Figures

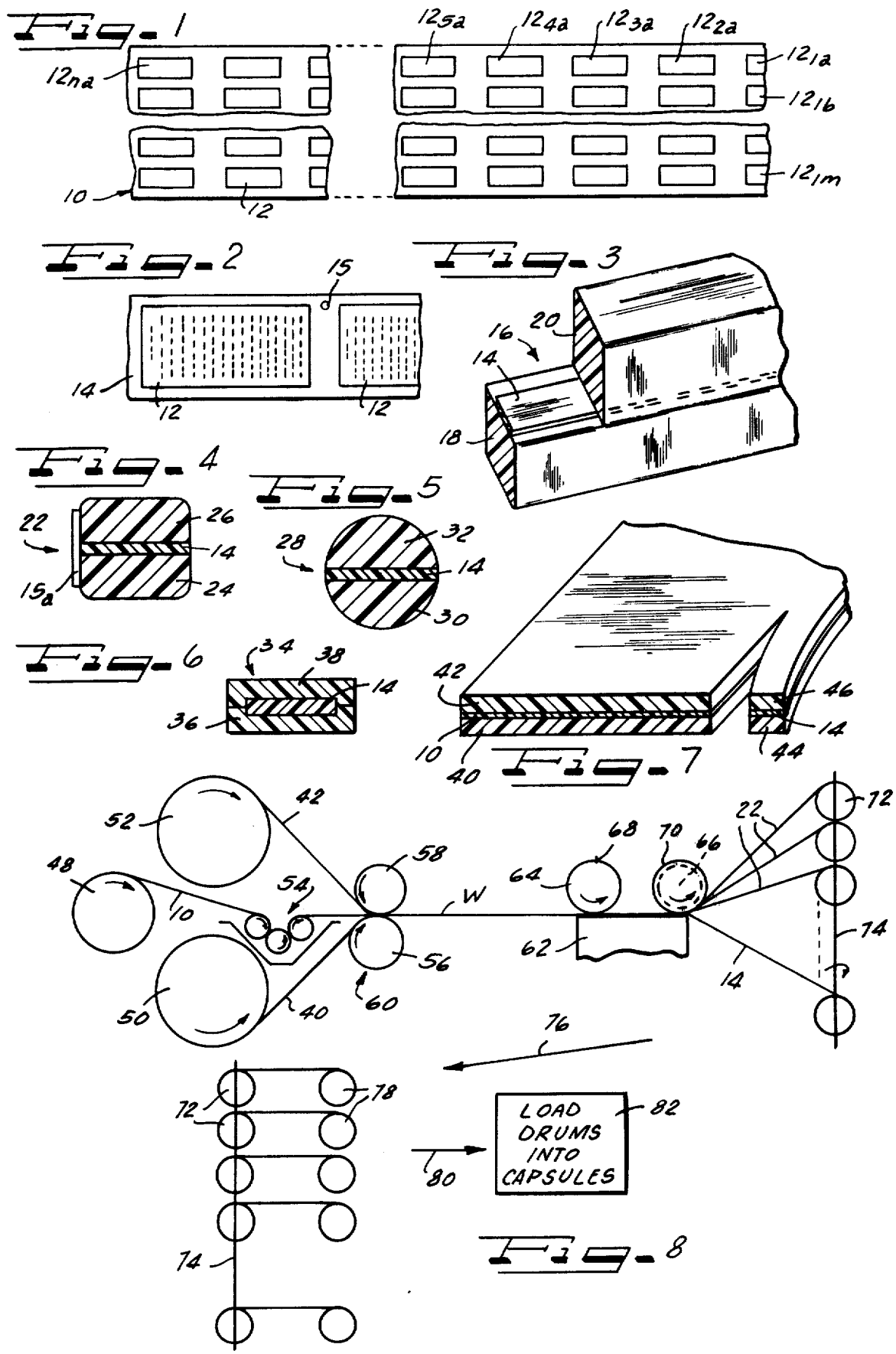

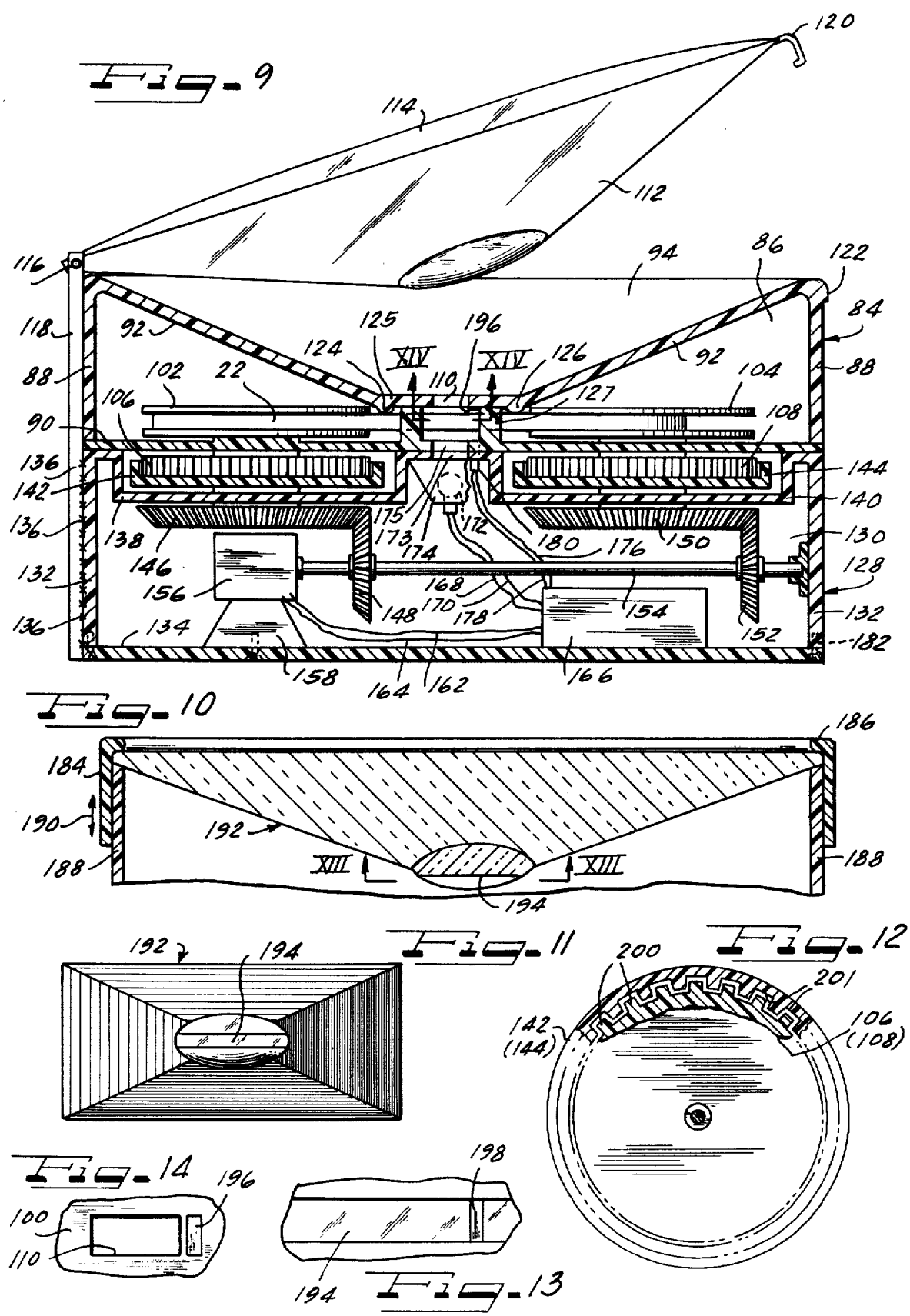

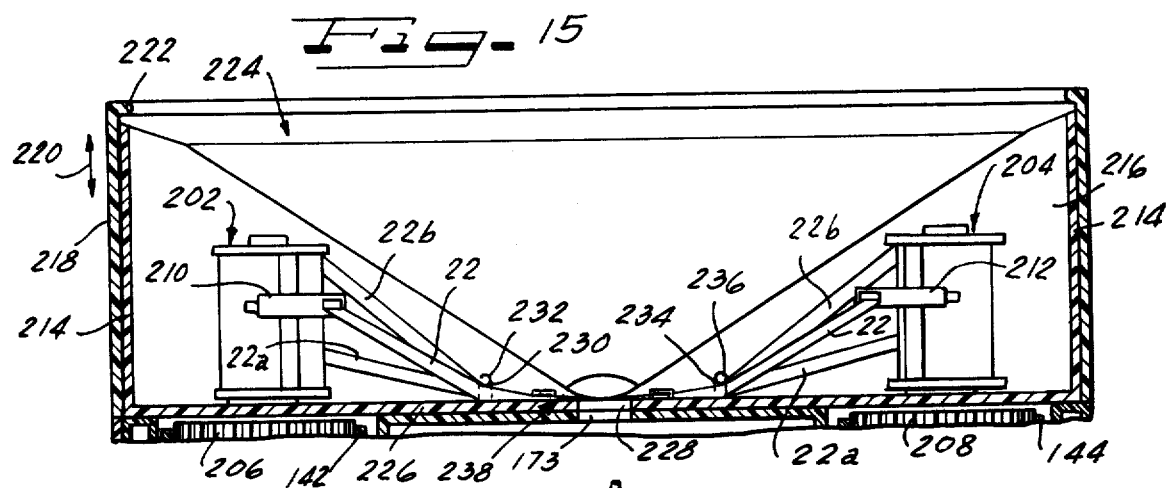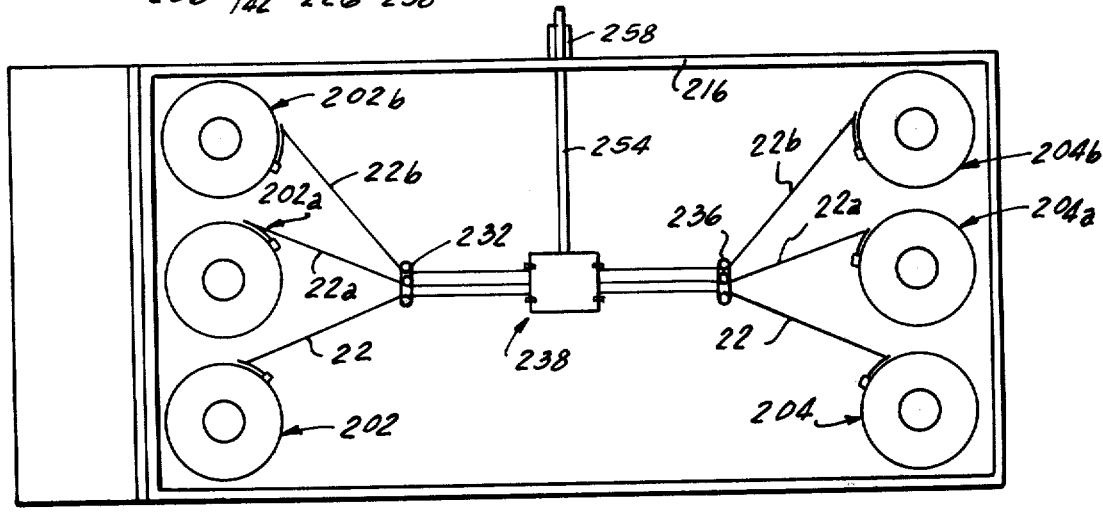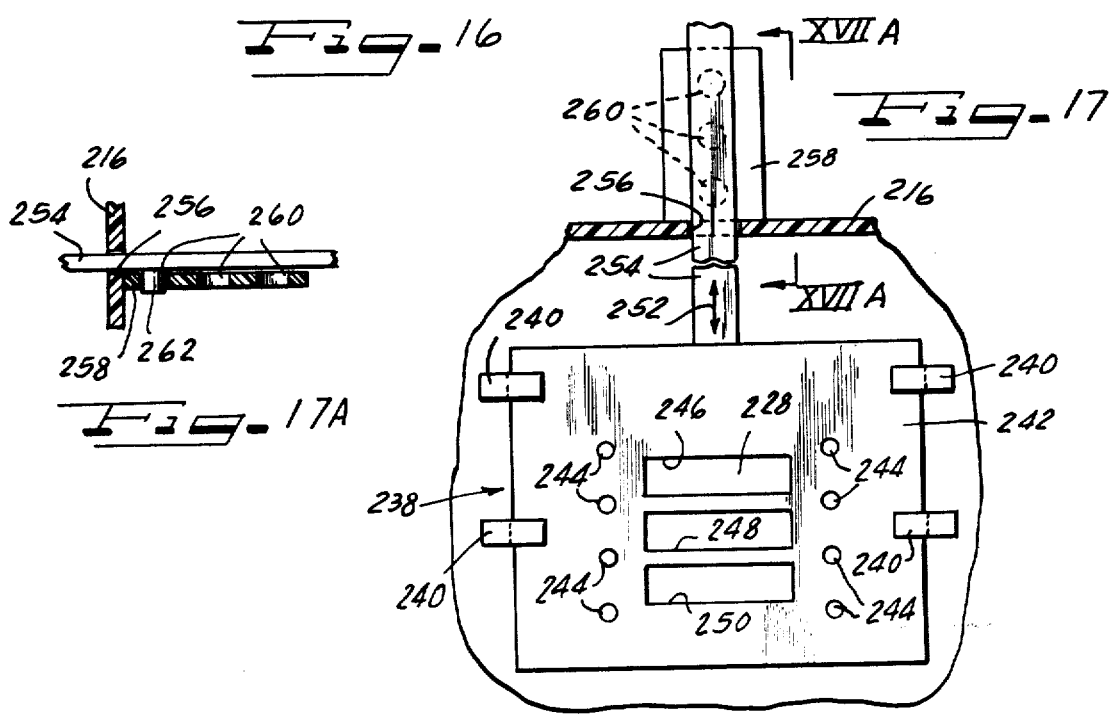

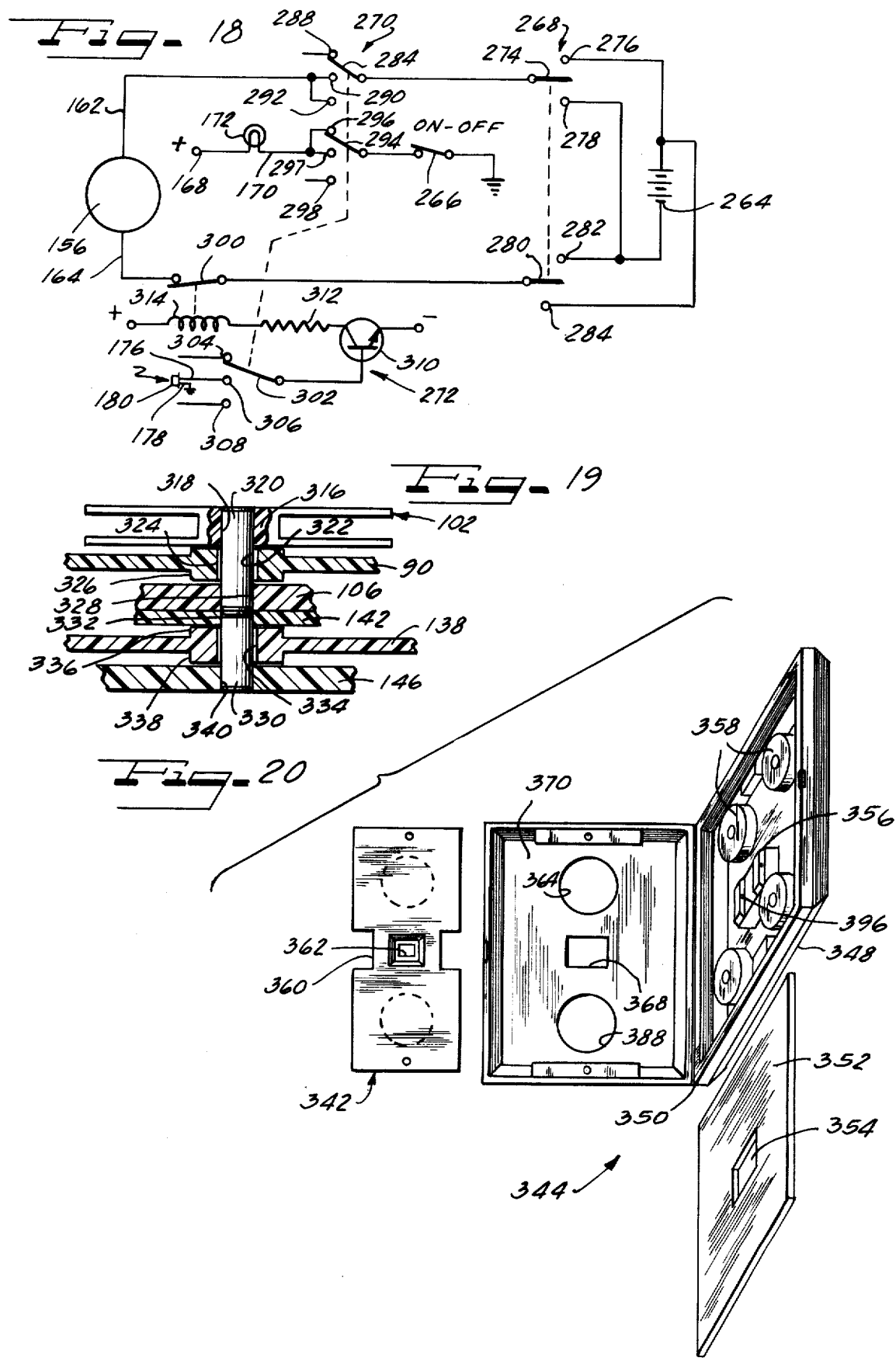

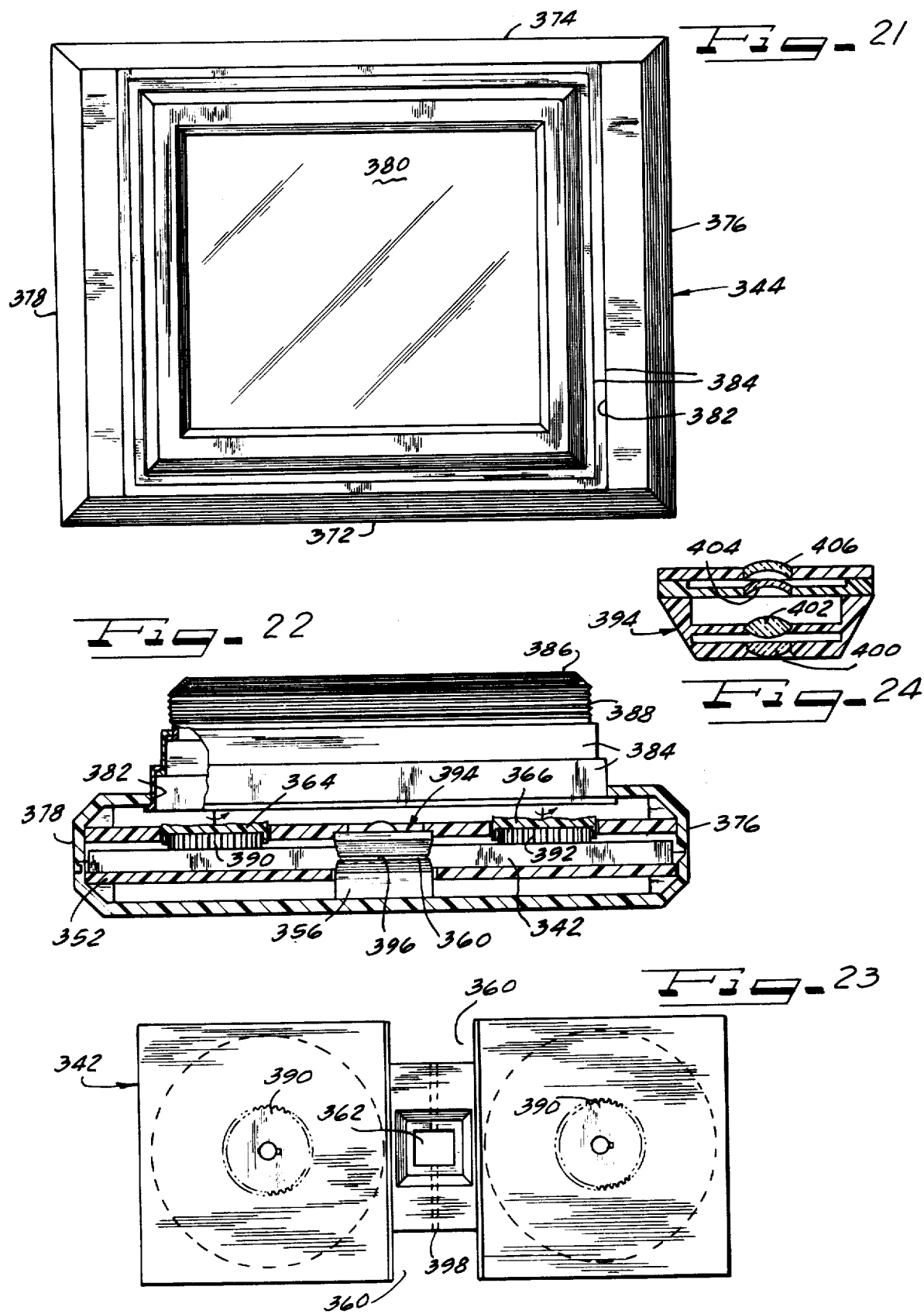

ELECTRIC BOOKS AND MICROFILM STRUCTURES AND THE PRODUCTION THEREOF FOR USE IN ELECTRIC BOOKS

BACKGROUND OF THE INVENTION

1. Field of the Invention

This invention relates to microfilm techniques, and is more particularly concerned with microfilm articles, the production of such articles, and apparatus for the utilization of such articles.

2. Description of the Prior Art

Film strip readers have been well known in the art for quite some time. S. E. Taylor in U.S. Pat. No. 2,745,313 discloses a film strip projector having a control for changing the speed of exhibition of the material being read. The Taylor apparatus is one of many such devices which are designed to be supported by a table or the like and to project the information content of the film onto a remote viewing screen.

W. Bartky in his U.S. Pat. No. 2,032,829 discloses a hand-held film strip device in which the information content of the film is projected toward a lens through which the operator views a virtual image of the information content. H. B. Shapiro in his U.S. Pat. No. 1,999,133 also discloses a hand-held device of generally the same type as disclosed by Bartky with the exception that the information content of the film is projected onto a small translucent screen which is actually smaller than the film itself.

One of the most successful models of a microfilm reader is the Viking manufactured by the Microform Products Division of Realist, Inc., Menomonee Falls, Wisconsin. This reader is a folding device which fits into an attache case. The reader includes a self-contained screen which can be utilized as a front or rear projection screen and the screen is removable for projection of larger images onto a remote flat reflective surface. This is a microfiche reader with x-y microfiche card adjustment and weighs approximately two pounds.

Text/Fiche publications basically include printed matter on paper in book or booklet form and one or more microfiche cards with the fiche information referenced by the printed matter. In reading such material, a person must refer back and forth between printed and projected subject matter. In the article "Chicago Press Launches New Micropublishing Project: Text/Fiche", published in the periodical "Publishers Weekly" of May 24, 1976, the Text/Fiche technology and its advantages and disadvantages are discussed with the conclusion that such publications are viable as limited edition university press publications and, that a larger edition potential as educational and consumer products could not yet be judged without field experience. The article goes on to say that the primary limitation on the latter type of publication is the lack of reading machines installed in offices, classrooms and homes of potential buyers. Furthermore, the article points out that additional incentives are needed to obtain better equipment at prices that will be attractive to individual purchasers and that such incentives must come from the publishing industry, by publishers committing themselves to a greater utilization of the Text/Fiche form of publication, in that the public has no reason to invest in equipment if there are no materials available to be viewed by such equipment.

SUMMARY OF THE INVENTION

It is therefore the primary object of the present invention to provide a stimulus to the publication industry through which the publication industry can economically provide microfilm publications to the public.

Another object of the invention is to provide an improvement over the Text/Fiche technique in which all of the information is placed on microfilm and readily retrieved without reference back and forth between printed and microfilm publications.

Another object of the invention is to provide a new microfilm article of manufacture which can be thought of as being disposable, but which may be reused over and over again in that the microfilm itself is protected from scraping, scratching and the like.

An attendant object of the latter object is to provide a new and improved process for encapsulating microfilm.

Another object of the invention is to provide a microfilm reader which releasably receives a replaceable microfilm capsule.

Another object of the invention is to provide a microfilm reader which is of simple and economic construction and which, in its smaller forms, can be held in and operated by one hand.

Another object of the invention is to provide a small and compact microfilm reader which can selectively read a plurality of microfilms which are classified as to subject matter, such as found in directory and catalog publications.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a plan view of a portion of a strip of microfilm illustrated as bearing sections of information arranged in longitudinal and transverse rows along the film;

FIG. 2 is an enlarged view of an information bearing section of the film illustrated in FIG. 1;

FIG. 3 is a perspective sectional view of one embodiment of an encapsulated strip of microfilm constructed in accordance with the invention;

FIG. 4 is a transverse sectional view of an encapsulated strip of microfilm similar to that of FIG. 3;

FIG. 5 is a transverse sectional view of another form of encapsulated microfilm which may be utilized in practicing the present invention;

FIG. 6 is a transverse sectional view of still another embodiment of a microfilm cord as may be used in practicing the present invention;

FIG. 7 is a perspective view illustrating the separation of a master film structure into a plurality of individual microfilm cords;

FIG. 8 is a schematic illustration of a film encapsulating process and a drum winding process in accordance with the present invention;

FIG. 9 is a longitudinal sectional view taken through a microfilm reader which is constructed in accordance with the principles of the present invention;

FIG. 10 is a sectional view of a different lens mounting structure than illustrated in FIG. 9;

FIG. 11 is a bottom view of a lens of the type illustrated in FIGS. 9 and 10;

FIG. 12 is a plan view of the engagement of the driving and driven gears of FIG. 9;

FIG. 13 is a fragmentary plan view taken substantially along the viewing line XIII—XIII of FIG. 10;

FIG. 14 is a plan view taken substantially along the viewing line XIV—XIV of FIG. 9;

FIG. 15 is a longitudinal sectional view of apparatus similar to that of FIGS. 9 and 10 specifically illustrating the use of a spool-type drum rather than a reel-type drum;

FIG. 16 is a plan view of the apparatus of FIG. 15 illustrating the utilization of a plurality of pairs of spools, each having a microfilm of a different classification of subject matter;

FIG. 17 is a fragmentary view of a portion of the apparatus of FIG. 16 showing one possible structure for shifting of viewing from one cord to another;

FIG. 17A is a fragmentary sectional view of the latching structure of FIG. 17 taken along the line XVIIA—XVIIA;

FIG. 18 is a schematic circuit diagram illustrating one type of electrical circuit which may advantageously be utilized in practicing the present invention;

FIG. 19 is a fragmentary sectional view of the mounting of the driving and driven gears for the microfilm cords of FIGS. 9 and 15;

FIG. 20 is a rear view of another embodiment of the invention specifically illustrating the manner of replacing a film capsule;

FIG. 21 is a top plan view of the microfilm reader of FIG. 20;

FIG. 22 is a longitudinal sectional view of the microfilm reader of FIG. 20;

FIG. 23 is a plan view of the capsule illustrated in FIGS. 20 and 22; and

FIG. 24 is a sectional view of a multi-element lens structure illustrated in FIG. 22.

DESCRIPTION OF THE PREFERRED EMBODIMENT

Referring to FIG. 1, a master strip 10 of microfilm is illustrated as comprising a plurality of longitudinal rows of information bearing sections $12_{la}$—$12_{na}$ and a plurality of transverse rows $12_{la}$—$12_{lm}$. Each of the rows a-m may constitute a separate book, while each of the transverse rows may constitute separate pages of a book. Each book, as far as the film goes, is recorded with a blank leading edge, a blank trailing edge, and a series of pages, such as a simplex-cine format, a-n. Each longitudinal row, therefore each book, is split from the master 10, to form a plurality of strips 14 of microfilm, as illustrated in FIG. 2. Each of the master films 10 may be constituted by, for example, 105 mm film and with each strip 14 having a width of approximately 1 mm, m=approximately 100 for a 105 mm wide web of microfilm.

In FIG. 2, a single strip 14, corresponding to a book, is illustrated as having a plurality of information bearing sections 12. Each of the information bearing sections 12 has associated therewith a clear control mark 15, whose purpose will be appreciated from the discussion below.

The microfilm strips 14, according to the invention, are protected against abrasion as would be encountered by scraping, scratching or the like due to environmental dust and the like by encapsulation in a variety of forms as generally illustrated in FIGS. 3-7. Referring to FIG. 3, a cord 16 comprises a microfilm strip 14 with the information bearing sections 12 thereon encapsulated between a pair of rectangular or square plastic strips 18 and 20. The microfilm is preferably a diazo film and the plastic strips are necessarily translucent and may be provided from a variety of materials such as acrylic plastic materials.

A different embodiment of the cord is illustrated in FIG. 4 wherein the cord 22 comprises the strip of microfilm 14 encapsulated between a pair of members 24 and 26. The cord 22 carries, as could the other cords described herein, an opaque mark $15_a$ which serves the same purpose as the control mark 15 in FIG. 2, as will also be apparent from the discussion below.

FIG. 5 illustrates an embodiment of a cord 28 in which the strip of microfilm 14 is encapsulated between a pair of generally semicircular cross section elements 30 and 32.

FIG. 6 illustrates a cord 34 in which the strip of microfilm 14 is encapsulated between a pair of members 36 and 38 each having a U-shaped cross section.

It will be appreciated that the encapsulating material in FIGS. 3 and 6 cover the entire strip of microfilm 14; whereas, in FIGS. 4 and 5 the encapsulating material covers only the major surfaces of the strip of microfilm 14.

Referring to FIG. 7, a master strip of microfilm 10 is illustrated as being encapsulated between a pair of members 40 and 42. During processing of the film into individual cords, the laminate is longitudinally split, as shown on the right-hand portion of FIG. 7 to provide individual cords in which the individual strips of microfilm 14 are encapsulated between a pair of encapsulating layers 44 and 46.

FIG. 8 illustrates a typical process by which a master strip of microfilm, such as heat developed diazo film, may be processed into a plurality of individual cords and the cords mounted in replaceable capsules for use in microfilm readers constructed in accordance with the principles of the present invention. Referring to FIG. 8, a master strip of microfilm 10, such as 105 mm diazo film; is fed from a roll 48 into a glue vat containing a glue agent which has a minimum of optical distortion when spread in a thin layer. A pair of rolls 50 and 52 feed the encapsulating material in the form of a lower web 40 and an upper web 42, corresponding to the structure of FIG. 7, to a location at which the master film 10 is sandwiched therebetween, the location being constituted by a pair of press rolls 56 and 58 which also be heated rolls to constitute a developing section 60. The rolls 56 and 58, with or without heating, laminate the three layers together to form a continuous web W of laminated material such as illustrated in FIG. 7. Alternatively, the press rolls 56 and 58 need not be heated and a laser welder may be provided downstream of the rolls to weld the film and encapsulating material at the outer edges and at points between each book, that is between each of the longitudinal rows a-m.

The continuous web secured in a laminated form is fed to a cutting station which includes a support 62, either stationary or in roller form, and a pair of cutting rolls 64 and 66. Depending on the particular sequence of operations desired, these rolls 64 and 66 are interchangeable. Preferably, the roll 64 is upstream of the roll 66. The roll 64 includes a cutter 68 which is designed and located to cut the film into longitudinal strips having a blank leading edge, a blank trailing edge, and a portion between the leading and trailing edges which bears the information sections 12 of a number of books, which number is determined by the width of the film 10, and the length of this intermediate section being determined by the total number n of information sections of the particular publication. The following roll 66 receives the strips of m books each having a length of n pages plus the blank leading and trailing edges, and carries the required number of slicing blades 70 to slice the strips of microfilm into a plurality of cords, such as the cords 22, representing the individual books recorded on the master 10. Each of the cords 22 has a leading edge which is connected to a respective drum 72. A plurality of such drums 72 are fixed to and rotatable on an axis or shaft 74 to rotate a predetermined number of revolutions which will cause the drums 72 to receive the major portion of the cords 22, with the exception of the trailing ends thereof.

The entire group of drums 72, on the shaft 74 is transferred to another station at which the trailing ends of the cords 22 are connected to respective corresponding drums 78. After such connection of the cords to two drums 72 and 78, they are transferred, as indicated by the arrow 80, to a station 82 at which the drums are loaded, in pairs, into replaceable capsules which are adapted to be received in microfilm readers constructed in accordance with the principles of the present invention.

Microfilm Readers

Referring now to FIG. 9, a longitudinal cross-sectional view of a microfilm reader constructed in accordance with the present invention, and with a capsule loaded therein is illustrated. The capsule is generally illustrated at 84 as comprising, as viewed in the drawing, a rear wall 86 (with a corresponding front wall cut away), a pair of end walls 88, a bottom wall 90, and a top wall structure including a rear inwardly and downwardly sloping wall 94 (and a corresponding cut away wall), a pair of downwardly and inwardly sloping walls 92, and a connecting wall 100. The bottom wall 90 may be connected to the walls 86 and 88 by any suitable means, such as by snap connections, metal fasteners (screws), fusing, bonding (gluing) or the like. The type of fastening is irrelevant, it only being necessary that the walls are secured together to form a generally dust-tight chamber.

Within this chamber between the side, bottom and top walls, a cord 22 is carried by a pair of drums, in this embodiment specifically a pair of reels 102 and 104 which are rotatably mounted in the bottom wall 90. Connected to and rotatable with the reels 102 and 104 are a pair of respective gears 106 and 108. It is readily apparent that rotation of the gears 106 and 108 will rotate the reels 102 and 104 to move the cord 22 past an opening 110 in the connecting wall 100. Assuming there to be a light disposed below the aperture 110, the information sections 12 will be projected onto a lens 112, in a form of a complex lens, to transmit an image therethrough in a divergent manner, both longitudinally and transversely, to a viewing screen 114 which may be clear, a translucent cover, a frosted surface or the like, depending on the particular divergence of the light rays and the material of the lens. Preferably the lens is a molded plastic structure, but the same may be formed of a plurality of plastic or glass lenses which will project a 150:1 microfilm reduction to a viewing screen size that is comparable, in this particular embodiment, to approximately the size of a page of a pocket book.

The bottom of the lens 112 seats against, or in proximity to, the aperture 110, the lens being adapted with a hinge 116 connected to a member 118 for rotating the lens open to receive the capsule and closed to be in an operative position. A latch mechanism may be formed by a molded section 120 carried on the distal end of the lens to hook around a projection 122 carried by the capsule 84. Of course, a reverse structure, as well as other structures are possible to secure the lens in the operating position.

As will be apparent from the discussion below, the member 118 is not connected to the adjacent end wall 88, to accommodate capsule removal and insertion.

In order to maintain the cord 22 at a predetermined distance from the lens 112, a pair of guides 124 and 126 may be molded to the bottom surface of the connecting wall 100. In addition, in order to guide and maintain the cord 22 along the proper path between the reels 102 and 104, a pair of guides 125 and 127 may be molded to be upstanding from the bottom wall 90. Furthermore, the bottom wall 90 includes an aperture 175 for light transmission, as will be evident from the discussion below.

The drive unit, the light unit and the control unit are hereinafter termed simply the "drive unit" and the same is generally illustrated at 128 as comprising a rear wall 130 (with a corresponding forward wall cut away), a pair of end walls 132 and a bottom wall 134 which may be secured to the rear, forward and end walls by fasteners, bonding or the like. One of the end walls, in this particular embodiment the left-hand end wall 132 is secured to the member 118, as indicated at 136, by fasteners, bonding or the like. Therefore, the drive unit 128 carries the lens and its supporting structure.

The drive unit also includes a top wall structure which has a pair of well-shaped depressions 138 and 140 in which a pair of gears 142 and 144 are rotatably mounted. The gears 142 and 144 are drive gears which releasably receive the driven gears 106 and 108 of the capsule 84. A more detailed showing of this structure is illustrated in FIG. 12 in which the drive gears 106 and 104 include radially extending teeth 200 which are received in radially extending cavities 201 of the respective drive gears 142 and 144.

The drive gear 142 is connected to a bevel gear 146 for rotation therewith, the bevel gear 146 being engaged with a bevel gear 148; the drive gear 144 is connected for rotation with a bevel gear 150, the bevel gear 150 being engaged with a bevel gear 152; and the bevel gears 148 and 152 being carried for mutual rotation by a shaft 154 which is connected to and rotated by a motor 156. The motor 156 is mounted to the bottom wall 134 by means of a mounting bracket 158 and, for example, fasteners 160.

The drive motor 156 is connected by a pair of electrical leads 162 and 164 to a control unit 166. Also, a pair of control leads 168 and 170 connect the control unit 166 to a lamp 172 mounted in a reflector 174, and a pair of leads 176 and 178 connect the control unit 166 to a light sensor 180. Light traversing the mark 15 impinges upon a reflector 196 on the bottom surface of the wall 100 and passes down through a passageway (not shown) to strike the light sensor 180 and control the termination of cord movement. An exemplary embodiment of a control circuit for this operation will be discussed below with reference to FIG. 18. The structure for accomplishing this light reflection function, however, is more clearly illustrated in FIG. 14.

As mentioned above, the bottom wall 134 may be connected to the walls 130 and 132 by bonding, or the same may be accomplished by the provision of a plurality of fasteners, such as the fastener illustrated at 182.

Referring to FIG. 10, the hinge structure of FIG. 9 may be eliminated by providing that the side and end walls terminate at a predetermined point, as illustrated by the walls 188, and that the lens, here a lens 192, be carried by a peripheral rim 184 which has a horizontally extending flange 186 which may be bonded to the lens 192. With such a structure, the lens 192 and its support 184 may be telescopically moved as indicated by the arrows 190, whereby the capsule is open at the top and is received in engagement between the drive unit 128 and the lens structure 184, 192. This structure may also provide for additional focusing to sharpen the image on the viewing surface.

In this structure, with the lens telescoped completely inwardly toward the drive unit, the bottom of the lens may be constructed as a film guide in the form of a groove 194. A bottom view of such a lens is illustrated in FIG. 11. Inasmuch as the construction of FIG. 10 obviates the necessity for the walls 92 and 94 in FIG. 9, a reflective surface for the light rays penetrating the control mark 15 must necessarily be provided at a different location. FIG. 13 illustrates the provision of a reflective member 198 within the groove 194 of the lens illustrated in FIGS. 10 and 11.

FIG. 15 illustrates another embodiment of the invention in which the drive unit is the same as that illustrated in FIG. 9, as modified the telescopic lens structure of FIG. 10. In FIG. 15, however, the capsule comprises a different type of drum apparatus. In this embodiment, a pair of drums are constituted by spool structures 202 and 204 which are constructed in the form of fishing reels having respective level wind apparatus 210 and 212. The spools 202 and 204 have respective driven gears 206 and 208 which correspond to the driven gears 106 and 108 of FIG. 9.

Referring to FIG. 16, a plurality of pairs of spools 202, 204; 202$_a$, 204$_a$; and 202$_b$, 204$_b$ are illustrated for a multiple version of the apparatus illustrated in FIG. 15. Each of the pairs of spools is provided with an independent drive system such as the drive system illustrated in FIG. 9, although a single light source is contemplated, and although a multiple light source may be employed. Inasmuch as a single light source is contemplated, because of the problems of alignment of the lens and the light source through apertures, the apparatus of FIG. 15 is provided with an adjustable film guide 238, illustrated in greater detail in FIGS. 17 and 17A.

Referring to FIGS. 17 and 17A, the adjustable film guide 238 is illustrated as comprising a plurality of upstanding and horizontally extending guide members 240 for engaging the edges of and slidably guiding a plate 242. The plate 242 includes a plurality of upstanding projections 244 for guiding the cords 22, 22$_a$ and 22$_b$ therethrough. In the position illustrated, the plate 242 includes an aperture 246 aligned with the aperture 228 of the bottom wall 226, to accommodate the cord 222$_b$, an aperture 248 to accommodate the cord 22$_a$, and an aperture 250 to accommodate the cord 22. In the position illustrated, the plate 242 and the guides 244 have pulled the cords so that the cord 22$_b$ is in registration, to the corresponding aperture 246, with the aperture 248. The plate 242 has attached thereto an elongate handle 254 which extends through an aperture 256 in the wall 216. The handle 254 carries a projection 262 which is selectively insertable into a plurality of apertures 260 in a plate 258 connected to the wall 216, the position of the apertures 260, center-to-center, corresponding to the center-to-center positions of the apertures 246–250, the handle 254, and thus the plate 242 being movable in the direction of the double headed arrow 252.

Although a variation of circuitry may be involved, and although other circuits may be employed in practicing the invention, a circuit for operating the reader of FIGS. 9-15, perhaps a multiple, is illustrated in FIG. 18 as comprising the drive motor 156, the lamp 172 and the sensor 180. The control circuit, such as a control circuit 166 in FIG. 9, comprises a source of power 264, a lamp on/off switch 266, a forward-reverse switch 268, an advance switch 270, and a sensing circuit 272. The control circuit further comprises a power source 264 connected to the forward-reverse switch 268 so that a switch contact 274, when connected to a contact 276, and a contact 280 when connected to a contact 282 causes rotation of the motor 156 in one direction and the contact 274 when connected to the contact 278 and the contact 280 when connected to the contact 284 causes rotation of the motor 156 in the opposite direction. The switch 268 is preferably a toggle switch and is mounted in an outer wall of the housing of the drive unit.

Similarly, the on-off switch 266 is mounted in the housing of the drive unit, as is the advance switch 270.

The advance switch 270 includes a rest position, a spring loaded single-step advance position, and a spring-loaded continuous advance position. With the switch 270 in the position illustrated, the lamp 172 is illuminated over a circuit including a positive connection by the lead 168 to the battery 264, and a ground connection or negative connection to the battery 264 by way of the switch contacts 296, 294 and the on-off switch contacts 266. This is the position for reading a page of a book.

With the switch 270 depressed to the position in which the contact 286 engages the contact 290 and the contact 294 engages the contact 297, the lamp is illuminated over substantially the same circuit; however, the motor 156 is energized by way of the contact 274 (276, 278) in the forward or reverse direction by way of the contact 280 (and the contacts 282, 284) to rotate the motor 156 in the desired direction. The contact 300 is normally closed. As the cord 22 containing the microfilm strip 14 reaches the desired position, light is transmitted through the clear section 15 and reflected to the sensor 180 whereupon a voltage is produced to energize a transistor 310 to provide a conductive circuit through a resistor 312 and a coil 314 to open the contacts 300 and stop the motor and movement of the cord 22. As will be appreciated from the discussion below, the cord 22 may alternatively carry an opaque spot 15$_a$ in which case the detection circuit 272 operates in the opposite fashion when light is blocked therefrom so as to open the contacts 300.

In order to advance the film within the cord continuously beyond a page-to-page stepped sequence, the switch 270 is operated to a position in which the contact 284 engages the contact 292, the contact 294 engages the contact 298 and the contact 302 engages the contact 308. The latter two engagements are, for all practical purposes, inoperative. The first engagement, however, causes the motor to continuously rotate until the switch is released, at which time the lamp 172 is illuminated so that the viewer may monitor the point of stopping and continue movement of the cord in the forward or reverse direction until such time, and in such a sequence so as to find the desired location on the cord, i.e. the desired page of the publication. The sequence of operation of the contacts of the switch 270 must be such that, in the continuous advance mode, the lamp 172 is turned off before the motor is continuously energized, so that the light detector circuit does not operate to terminate motor operation before the switch 270 is released. The switch 270 is also mounted in the drive unit housing at a convenient location adjacent the switches 266 and 268. The battery 264, can, of course, be mounted in a battery support structure (not shown) within the drive unit, preferably on the bottom wall thereof.

Referring to FIG. 19, one possible structure for rotatably mounting the driving and driven gears is illustrated. The drum, or reel, 102 is seen as comprising a hub 316 which has a central bore 318 for receiving one end of a shaft 320. This may be a spline connection, a friction fit or the like. The shaft 320 extends through a slightly larger diameter bore 322 in the bottom wall 90 and the opposite end of the shaft is again connected by a friction fit or the like in a central bore 328 of the driven gear 106. The bottom wall 90 may advantageously have upper and lower projections 324 and 326 thereon to serve as bushings. Also, anti-friction discs may be provided at these points to minimize friction and wear. The driving portion of the gear arrangement includes a second shaft 330 which is friction fit at one end in a central bore 332 of the driving gear 142. At its opposite end, the shaft 330 is friction fit in a bore 340 in the bevel gear 346. The shaft 330 extends through a slightly larger diameter bore 334 in the well wall 138 and may also advantageously include anti-friction projections 336 and 338 and/or anti-friction discs.

FIGS. 20-24 illustrate another embodiment of a microfilm reader and capsule structure which, referring to FIG. 20, comprises a capsule 342 and a reader including two sections 346 and 348 joined together by a hinge 350. Appropriate latching tabs for the two sections have not been illustrated although the same may take the general form illustrated at 120, 122 in FIG. 9. The section 348 includes a plurality of sidewalls and a bottom wall which define a chamber or recess for mounting a light source 356 and a plurality of batteries or other electrical components 358. The recess is closed by a plate 352 which has an aperture 354 for receiving the light source 356 therethrough.

The capsule 342 includes a pair of side recesses 360 which enable one to grip the capsule between a thumb and forefinger for inserting and removing the same from the reader. The side of the capsule 342 not shown includes a pair of driven gears as in the previous embodiment which are received in respective drive gears 364 and 366 through corresponding apertures in a wall 370 of the reader. The wall 370 includes an aperture 368 through which a lens system extends, as best seen in FIG. 22. The capsule 342 also includes a central aperture 362 which is tapered on both sides to receive the light source 356 and the lens system, respectively.

More specifically, and referring in particular to FIGS. 21-24, the reader 344 comprises a pair of generally parallel sidewalls 372 and 374 and a pair of generally parallel end walls 376 and 378. A viewing screen 380 is supported in a central opening 382 in a rectangular ring structure 386. As an adjustment, a plurality of telescopic rings 384 may be provided, as well as a knurlled periphery 388 on the ring structure 386.

The control and driving apparatus has not been illustrated in FIG. 22, in that such apparatus can be the same as or similar to that illustrated in FIG. 9.

FIGS. 22 and 23 illustrate the capsule 342 and its position within the microfilm reader. The capsule 342 comprises a pair of driven gears 390 and 392 which are received in and drivingly engaged by a respective pair of drive gears 364 and 366 on the lower side the aperture 360 is tapered to receive the upper portion of the light source 356, while on the upper side the aperture 360 is oppositely tapered to receive the bottom portion of a lens systems 394. The frame-by-frame stopping control may be the same as that illustrated in FIG. 9, or, as illustrated in FIGS. 20, 22 and 23, the light source 356 may include a separate transverse aperture (or a separate transversely directed lamp beam) as indicated at 396, for transmitting a beam of light transversely through a passageway 398 in the central portion of the capsule. With such structure, the circuit of FIG. 18 would be adapted to operate, as mentioned above, with an opaque mark, such as that illustrated at $15_a$ in FIG. 4.

The lens 394 has been designed as a plurality of glass or plastic lenses in a complex lens structure which can be individually altered and bonded together, or which can be individually molded in steps forming an integral lens structure. The lens illustrated comprises four lens structures including a convex-planar lens 400, a convex-convex lens 402, and a pair of concave-convex lenses 404 and 406.

It is readily apparent that each of the reader and capsule systems described above offer certain advantages and disadvantages with respect to each other. For example, the embodiment of FIG. 20 provides a generally flat and more compact arrangement, while the embodiment of FIG. 15 offers a higher information content and may include individual microfilm and microfilm control sections for subject matter which is classified along certain desired lines. Each of the systems, however, offers the advantages of low-cost mass fabrication, low-cost long-life capsules, and ease in transporting, loading and unloading.

Although hand held embodiments of the invention have been described herein, it is readily apparent that this structure may be provided on a self-supporting stand, as a wall-mounted unit or as a desk unit. In any of these forms, however, the same benefits mentioned above are evident.

In view of the wide range of application including applications in the home and in travel, and applications of cataloguing such as for telephone companies and mail-order sales, and applications of a business, industrial, governmental, or institutional nature, such as hospitals, the features of the invention and certain benefits corresponding to those features are set forth below in tabular form, there of course being an overlap in certain features and benefits because of the nature of corresponding advantages offered to each of the above applications.

TABLE I

| POCKET MODEL (Home, Office Travel, Etc.) | |
|---|---|
| Feature | Benefit |
| Pocket Size | Light, compact and portable; Easy to load, unload and operate |
| Lighted Background | Use in dimly lit areas |
| Tinted Background | Easy on the eye; less eye strain |
| Touch Auto Page Advance | One hand operation |
| Full Substantially Flat Full Page View | Hands free reading of full page |
| Page Hold | No page marker needed |
| Forward/Reverse Control | Advance in forward or reverse direction to desired |

TABLE I-continued
POCKET MODEL
(Home, Office Travel, Etc.)

| Feature | Benefit |
|---|---|
| On/Off | page<br>Activates light<br>Spot read and hold page |
| Encapsulated Film Cord | Protects print information, no dye migration; no print smudge from newspapers; light, compact, portable |
| Lens Dimensions | Full pocket book print area when used for pocket books |
| Battery Operation | Use anywhere; ac/dc adapter may also be used |

TABLE II
TELEPHONE DIRECTORY
(Telephone Company)

| Feature | Benefit |
|---|---|
| Electromechanical Unit | May be supplied to customers; subscription basis or automatic periodic mailing of capsules |
| Multispool Capsule | Consolidation of directories into one unit operation<br>Shipping and handling-eliminate personal delivery of directory<br>Directories may be mailed with computer mail addressing<br>Decrease overordering and decrease in replacement "lost book" requests<br>Cost savings in printing and publishing<br>Decrease in information and assistance requests<br>Provides large information capacity in small space<br>Overcomes price increase problems attendant to publishing<br>May be packaged with private directory for government/industry/institutional use |
| Encapsulated Cord | Protection of directory<br>Large material capacity<br>Larger viewing print size than present directories-also an aid to the visually handicapped<br>Less costly than regular print |
| Computer Output Microfilm/Printing Microcord | No significant change in current printing system<br>Eliminates computer-to-paper and uses computer-to-film printing |

Similar features and benefits correspond to the cataloge operations of large mail-order houses.

TABLE III
TELEPHONE DIRECTORY
(Home/Business/Industry/Government/Institutional)

| Feature | Benefit |
|---|---|
| Wall/Desk Unit | Provides immediate and convenient all directory access<br>Saves time<br>Improves efficiency<br>No telephone book storage<br>Solves missing or misplaced book problem<br>Reduces information or assistance calls<br>Aids handicapped-eldery, invalid |
| Multispool Capsule | All directories in one capsule, individually accessed<br>Private or special directory may be included |

In addition to the foregoing advantages and benefits which characterize the present invention, the encapsulation of the microfilm overcomes the previous problems encountered in reading microfilm. More specifically the microfilm, in the cord form, does not twist, bend, buckle or warp, so that the source-to-film distance is always the same, the film-to-lens distance is always the same, and the film is maintained in a planar condition parallel to the light apertures.

In developing my invention, I have had a study made of the viewing system and the following sets forth that viewing system which is within the limits of the present state of the art in optical design. In this system, there are two features which distinguish it from all previous designs, namely the cord method of storing images and the wide angle projection lens employed for reproducing the images on a viewing screen.

VIEWING SCREEN

A viewing screen is 152 mm×203 mm (6×8 inches) in size. It is a diffused rear projection screen, backed up with a Fresnel lens which serves to enhance screen brightness in the corners and reduce the "hot spot" in the center. This arrangement is typical in the industry. Because of the wide angle characteristics of the projection lens, however, the Fresnel lens must be designed to work at a much lower F-number than in conventional viewers.

The long and short focal coordinates of the Fresnel lens are the reader's eye and the projection lens, respectively. Assigning the values 508 mm (20 inches) and 127 mm (5 inches) to these quantities, the required focal length of the Fresnel lens is 102 mm (4 inches). The effective aperture of the Fresnel lens equals the diagonal of the screen, or 254 mm (10 inches). Dividing the focal length by the effective aperture yields the relative aperture, or F-number, F/0.4.

This is a very small aperture by viewers standards; however, a precedent does exist in some overhead projectors (viewgraphs) in which two Fresnel lenses are cemented together to yield relatively small apertures, such as F/0.33.

Projection Lens

The projection lens is to lie 127 mm (5 inches) in front of the viewing screen. The corresponding angular field to the corners of the screen is ±45°, which again is large by contemporary industry standards. The lens must produce magnification sufficient to fill the screen with the cord stored image. The value of the magnification is the ratio of screen size to cord image size. Assuming the latter to be 1.0×0.75 mm (0.040×0.030 inch), the required magnification becomes 200X. To appreciate the difficulty of achieving this, it should be compared with the requirements of an oil emergent microscope objective, which are simpler in three respects:
(1) The magnification is less: 100X
(2) The projection distance is greater: 160 mm typical tube length.
(3) The field coverage is considerably less: approximately ±3.6°.

The focal length of the projection lens can be approximately calculated from the equation $$f = T/(2 + M + 1/M)$$

where T is the overall object to image distance, excluding the lens thickness, and M is the magnification. Assigning a value of 130 mm to the quantity T, f becomes 0.64 mm (0.025 inch). This is an extremely short focal length and calls for lens elements of very tiny size, since typically the diameters of lens elements in an optical system are more or less equal to the system focal length.

The projection lens is required to produce maximum illumination on the screen, which can be calculated from the equation $$E = B \cdot A/d^2$$

where E is the illumination, B is the brightness of the lens entrance pupil, A is the area of the lens entrance pupil, and d is the projection distance. If we assume the lens entrance pupil diameter to be equal to the focal length (an F/1 lens) its area becomes 0.32 mm$^2$. A practical upper limit for B is 5 Candela/mm$^2$ so that the product B·A becomes 1.6 Candela. This produces an illumination on the screen of about nine lumens per square foot, or a screen brightness of about 9 foot-lamberts. This value must be increased by the screen gain and the Fresnel lens to 20 or 30 foot-lamberts.

For easy reading, resolution on the screen should be in the range of three to five lines per millimeter; this relates to resolution requirements of the projection lens directly in proportion to the magnification. Thus, the lens system must be capable of resolving 600–1000 lines per millimeter. This represents an improvement factor of 3–5 times over contemporary microfiche lenses, which work at much lower magnification levels. High resolution also imposes a requirement for a very "fast" lens (i.e. a low F-number). A good rule of thumb, based on theoretical grounds, is that limiting resolution equals 1700 divided by the F-number. Thus, to theoretically reach 1000 lines per millimeter, one must have an F/1.7 or faster lens. Since it has already been determined above that an F/1 lens is needed to provide acceptable screen illumination, this consideration presents no constraint.

Cord Storage

The microfilm cord carries the images to be magnified deeply embedded in a protective plastic material. Because of the high quality imaging requirements, each microimage on the cord must track through the same focal plane as the others if re-focusing is to be avoided. The focal tolerance for an F/1 lens is ±0.0022 mm (0.00009 inch). Even small amounts of twisting of the cord must be prevented. It can be calculated that a twist of three degrees per centimeter will throw opposite sides of the image out of focus. The refractive effects of the cord sheath must be compensated in the design of the projection lens. If the surface is held optically flat this presents no problem; however, if it is cylindrical or warped out of planarity, a loss in resolution will appear.

From the advantages of the encapsulating technique discussed above, and from the advantages listed below, it is apparent that previous problems in resolution can be illuminated by the instant design.

The cord design offers the following solutions for micrographics problems in that the cord protects the microfilm:
A. From scratching
B. From electrostatic dust
C. Warping/bending at edges when used in a roll
D. From stretching (roll)/distortion
E. From twisting
F. From fading quickly-molecular drive off
G. Fingerprints, atmospheric borne oil, etc
H. From humidity
I. From temperature damage
J. From water or liquid damage
K. From wear in general and offers the following advantages:
A. Constant alignment and positioning with no possibility for deviation
B. Expanded functions for microfilm (expanded marker)
  (1) truly portable in volume
  (2) to consumer
C. Operation in a relatively inexpensive form
D. Convenience
E. Mass production
F. Lower system and equipment cost
G. Individual control over materials
H. Potential for inexpensive, simple indexing and coding
I. Simplified viewing operation

ILLUMINATION SYSTEM

The design of the suitable wide source and condenser lens accommodation must proceed concurrently with the projection lens design. It is the function of the condensor lens to image the light source to the exit pupil of the projection lens, while simultaneously being matched to the relative aperture thereof. When these conditions are satisfied, maximum screen illumination results. The filament size need be only so large that its image fills the exit pupil; this is of the order of one square millimeter. Anything larger is wasteful of power. Power consumption in the range of ordinary flashlight lamps (0.5–1 watt) is anticipated.

The condenser system need not consist of lenses; often spherical or elliptical mirrors are employed with considerable success. The current trend is toward integral lamp-reflector combinations, and such is appropriate in the present case.

The Development of Cord

The cord has been described to some extent above. The method of production must use a product having the characteristics of accurate location (in depth) and flatness of the microimages. These characteristics must be held to a tolerance of ±0.002 mm (±0.00009 inch). If this tolerance is exceeded, page-to-page refocussing will be required; or worse, a given page will not appear uniformly in focus from corner to corner. It is apparent that twisting of the cord will produce an out of flat condition also; and based on the above tolerance, twisting must be held to less than three degrees per centimeter.

One other physical parameter of the cord is also of great optical significance, namely the flatness of its top surface. Inasmuchas the top surface lies between the microimage and the projection lens, any irregularities in this surface will cause parts of the microimage to lose focus. A gross calculation shows that the area immediately over the microimage (approximately one square millimeter) must remain flat within 0.003 mm (0.00012 inch) to hold satisfactory focus.

The Development of Projection Lens

In the discussion, the following lens specifications were developed.

(1) A focal length of 0.64 mm (0.025 inch)
(2) A relative aperture of F/1 (preferred) to F/1.7
(3) A field of view of ±45 degrees
(4) A resolution of 600–1,000 lines/mm.

The specification of focal length is of no consequence to the designer since the lenses can be linearly scaled up or down in focal length (and size) with little overall effect on performance. As a matter of fact, scaling a lens system to shorter focal lengths generally improves its theoretical performance across the board. The problems arise when one tries to fabricate a system of very short focal length.

In practically all lens systems the diameters of the individual elements range somewhere between one-fourth and four times the system focal length. Inasmuchas the system focal length set forth above is in the order of 0.64 mm, one might expect the individual element diameters to range between 0.16 mm (0.006 inch) and 2.5 mm (0.100 inch). It is extremely unlikely that lenses at the smaller end of this range could be fabricated using conventional optical shop techniques. In fact, lenses at the upper end of this range are not too common. Moreover, to meet the other system requirements of relative aperture, field, and resolution will require a very complex system, perhaps incorporating twelve or more elements. These elements, as small as they are, must be accurately aligned and spaced apart from one another. Thus mechanical mounting methods will become stringent. Finally, in complex systems the lens elements must be coated to minimize surface reflections, which otherwise cause excessive glare and loss of contrast. Progress is now being made in the art to coat plastic elements of any size.

The above design considerations have been directed to a small hand-held model. Any consideration which reduces the magnification requirement eases the lens requirements. For example, if the cord diameter is increased, the microimage size increases proportionally. Even if the projection distance does not change, the focal length increases and the lens element becomes larger and less expensive, when one is considering the above type of structure as a first-case design. If in addition the projection distance is permitted to increase, as can be done in desk and wall models, simplification is compounded. Not only does the focal length again increase with further increase in the size and decrease in cost of the elements, but the angular coverage is reduced and leads to a lens system having fewer elements.

Although I have described my invention by reference to particular illustrative embodiments thereof, many changes and modifications of the invention may become apparent to those skilled in the art without departing from the spirit and scope thereof. I therefore intend to include within the patent warranted hereon all such changes and modifications as may reasonably and properly be included within the scope of my contribution to the art.

What I claim is:
1. A microfilm capsule comprising:
  a base plate including an aperture therein for receiving light;
  a pair of drums rotatably mounted on said base plate on opposite sides of said light aperture;
  a microfilm cord attached to and wound on and off of said drums, said cord including an elongate strip of microfilm having a pair of opposite surfaces extending between a pair of edges and information-bearing sections thereon and transparent protective means encapsulating said strip, said cord wound about said drums such that said surfaces of said strip are substantially perpendicular to the axes of rotation of said drums;
  guide means for guiding said cord over said aperture; and
  driven means carried on each of said drums for receiving rotary inputs to rotate said drums and move said cord across said aperture.

2. The microfilm capsule of claim 1, comprising: a plurality of side walls secured to said base plate; and a top wall secured to said side walls, said top wall including another aperture aligned with the first-mentioned aperture to pass an information-bearing light beam.

3. The microfilm capsule of claim 1, wherein: each of said drums comprises a reel for winding said cord in a direct overlapping relation.

4. The microfilm capsule of claim 1, wherein: each of said drums comprises a spool structure including level-wind apparatus.

5. The microfilm capsule of claim 1, comprising: a light passageway for guiding a control light beam through said capsule.

6. The microfilm capsule of claim 1, wherein said base plate includes a pair of bores therethrough, and comprising a pair of shafts extending through and rotatable in respective ones of said bores, one end of each said shaft connected to a respective one of said drums for mutual rotation, each of said driven means comprising a gear connected to the other end of a respective shaft for engagement with a driving gear.

7. The microfilm capsule of claim 1, comprising: a cover connected to said base plate and including another
  aperture aligned with the first-mentioned aperture and
  a tapered portion extending toward said other aperture.

8. The microfilm capsule of claim 1, comprising: walls extending from said base plate and adapted to receive
  and locate a pyramid-shaped lens adajcent said cord.

9. A microfilm reader for reading information stored in a microfilm capsule, comprising:
  a housing having an aperture therein;
  motor means mounted in said housing;
  a pair of microfilm capsule engaging drive gears connected to and rotated by said motor means, said drive gears rotatably mounted to said housing;
  a light source mounted in said housing to radiate light through said aperture;
  a control circuit connected to and operable to control the operation of said motor means and said light source;

a viewing screen mounted on said housing in alignment with said light source and said aperture; and a lens system carried by said housing spaced from said aperture to receive a microfilm strip therebetween, and in direct alignment with said light source, said aperture and said viewing screen.

10. The microfilm reader of claim 9, wherein said lens system is hinged to said housing.

11. The microfilm reader of claim 9, wherein said viewing screen is carried directly on and is integral with said lens system.

12. The microfilm reader of claim 9, wherein said lens system comprises a multi-lens structure.

13. The microfilm reader of claim 9, wherein said control circuit comprises:

first means responsive to the microfilm being read to step said motor means to move said microfilm from one microfilm storage section to the next; and selectively operable second means to cause continuous operation of said motor means to continuously advance the microfilm over a desired interval.

14. A microfilm capsule comprising:

a base plate including an aperture therein for receiving light therethrough;

a pair of drums rotatably mounted on said base plate on opposite sides of said aperture;

a microfilm cord attached to and wound on and off of said drums, said cord including an elongate strip of microfilm having a pair of surfaces extending approximately 1 mm wide between a pair of edges and information-bearing sections thereon and transparent protective means encapsulating said strip, said cord wound about said drums with said surfaces substantially perpendicular to the axes of said drums;

guide means having a rectangular tunnel-shaped aperture; and driven means carried by said drums for receiving rotary inputs.

15. The capsule of claim 14, wherein:

said cord has a cross-sectional shape which is substantially rectangular with the corners of the rectangle cut off complementary to said guide means.

16. A microfilm capsule comprising:

a base plate including an aperture therein for receiving light;

a pair of drums rotatably mounted on said base plate on opposite sides of said light aperture;

a microfilm cord attached to and wound on and off of said drums, said cord including an elongate strip of microfilm having a pair of opposite surfaces extending between a pair of edges and information-bearing sections thereon and transparent protective means encapsulating said strip, said cord wound about said drums such that said surfaces of said strip are substantially perpendicular to the axes of rotation of said drums;

guide means for guiding said cord over said aperture;

driven means carried on each of said drums for receiving rotary inputs to rotate said drums and move said cord across said aperture;

a plurality of other pairs of said drums and a plurality of other cords, each other pair of said drums attached to a respective other cord and each other cord bearing information sections of different information content;

a plurality of other driven means carried by respective ones of said other drums; and wherein said guide means is movably mounted for movement with respect to said base plate to guide a selected cord over said aperture.

17. A microfilm capsule and in combination therewith a microfilm reader for reading information stored in the microfilm capsule, said microfilm reader comprising a housing having an aperture therein, motor means mounted in said housing, a paior of microfilm capsule engaging drive gears connected to and rotated by said motor means, said drive gears rotatably mounted to said housing, a light source mounted in said housing to radiate light through said aperture, a control circuit connected to and operable to control the operation of said motor means and said light source, a viewing screen mounted on said housing in alignment with said light source and said aperture, and a lens system carried by said housing spaced from said aperture to receive a microfilm strip therebetween, and in direct alignment with said light source, said aperture and said viewing screen; and said microfilm capsule comprising a capsule housing, a pair of drums rotatably mounted in said capsule housing, a pair of driven gears mounted outside of said capsule housing for mutual rotation with respective ones of said drums, each of said driven gears engageable with respective ones of said drive gears, a microfilm cord connected to said drums to be wound upon and unwound therefrom, said cord including a strip of microfilm bearing information-bearing sections, said strip having flat surfaces, and a transparent protective covering carried on said surfaces of said strip of microfilm, said cord wound with said flat surfaces substantially perpendicular to the axes of said drums, an aperture in said capsule housing positioned for alignment with the aperture in said reader housing, and guide means in said capsule housing to guide said microfilm cord over the capsule aperture.

18. The combination of claim 17, wherein said viewing screen is telescopically mounted for movement toward and away from said light source.

19. A microfilm reading system comprising:

a drive unit including an aperture, a drive unit housing, motor means mounted in said housing, a light source mounted in said housing adjacent said aperture, a pair of drive gears rotatably mounted outside of said housing and operably connected to said motor means, control means connected to and controlling the operation of said motor means and said light source, and a lens system carried by said housing;

a microfilm capsule unit including a capsule housing including an aperture for operative alignment with the aperture in said drive unit housing, a pair of driven gears rotatably mounted outside of said capsule housing and in releasable engagement with said drive gears, a pair of drums within said capsule housing connected to respective ones of said driven gears for rotation therewith, a microfilm cord connected to be wound upon and off of said drums including a strip of information-bearing microfilm and a transparent protective cover carried over said strip, and guide means for guiding said cord over said capsule aperture; and a viewing screen carried on one of said units to receive the information-bearing light beam traversing said lens systems, said viewing screen carried by said lens system and said lens system hinge-connected to said drive unit housing for receipt of said capsule therebetween.

20. A microfilm reader for reading information stored in a microfilm capsule, comprising:

a housing having an aperture therein;

motor means mounted in said housing;

a pair of microfilm capsule engaging drive gears connected to and rotated by said motor means, said drive gears rotatably mounted to said housing;

a light souce mounted in said housing to radiate light through said aperture;

a control circuit connected to an operable to control the operation of said motor means said light source, said control circuit comprising first means responsive to the microfilm being read to step said motor means to move the microfilm from one microfilm storage section to the next, and selectively operable second means to cause continuous operation of said motor means to continuously advance the microfilm over a desired interval;

a viewing screen; and a lens system carried by said housing spaced from said aperture to receive a microfilm strip therebetween, and in direct alignment with said light source, said aperture and said viewing screen, said viewing screen being carried by said lens system and said lens system being telescopically carried by the microfilm capsule.

21. A microfilm reading system comprising:

a drive unit including an aperture, a drive unit housing, motor means mounted in said housing, a light source mounted in said housing adjacent said aperture, a pair of drive gears rotatably mounted outside of said housing and operably connected to said motor means, control means connected to and controlling the operation of said motor means and said light source, and a lens system carried by said housing;

a microfilm capsule unit including a capsule housing including an aperture for operative alignment with the aperture in said drive unit housing, a pair of driven gears rotatably mounted outside of said capsule housing and in releasable engagement with said drive gears, a pair of drums within said capsule housing connected to respective ones of said driven gears for rotation therewith, a microfilm cord connected to be wound upon and off of said drums including a strip of information-bearing microfilm and a transparent protective cover carried over said strip, and guide means for guiding said cord over said capsule aperture; and a viewing screen carried on one of said units to receive the information-bearing light beam traversing said lens system, said drive unit housing including two releasably engageable parts for receiving said capsule therebetween, said light source mounted in one of said parts, said lens system mounted in the other of said parts, and said viewing screen mounted on said other parts spaced from said lens system.

22. The microfilm reading system of claim 21, wherein said viewing screen is telescopically mounted on said other part.

* * * * *